United States Patent
Ma et al.

(10) Patent No.: US 6,236,536 B1
(45) Date of Patent: May 22, 2001

(54) SYSTEM AND METHOD OF SERVO COMPENSATION FOR FRICTION INDUCED OFF TRACK PROBLEM IN A DATA STORAGE DEVICE

(75) Inventors: Yiping Ma, Layton; James M. Bero, Ogden, both of UT (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/390,803

(22) Filed: Sep. 7, 1999

(51) Int. Cl.[7] .................... G11B 25/04; G11B 17/028; G11B 19/20
(52) U.S. Cl. ..................... 360/99.08; 360/99.12; 360/99.04; 369/270
(58) Field of Search .............. 360/99.04, 99.12; 369/264, 266, 270, 271

(56) References Cited

U.S. PATENT DOCUMENTS

| | | | |
|---|---|---|---|
| 4,679,103 | 7/1987 | Workman | 360/77 |
| 5,402,280 | 3/1995 | Supino | 360/77.04 |
| 5,404,253 | 4/1995 | Painter | 360/77.04 |
| 5,442,498 | 8/1995 | Cheung et al. | 360/77.08 |
| 5,537,272 * | 7/1996 | Kazmierczak et al. | 360/99.08 |
| 5,539,714 | 7/1996 | Andrews, Jr. et al. | 369/44.26 |
| 5,550,685 | 8/1996 | Drouin | 360/77.08 |
| 5,576,909 | 11/1996 | Dierkes et al. | 360/78.09 |
| 5,585,976 | 12/1996 | Pham | 360/77.04 |
| 5,587,785 | 12/1996 | Kato et al. | 356/28.5 |
| 5,675,448 | 10/1997 | Molstad et al. | 360/77.12 |
| 5,687,038 | 11/1997 | Sugawara et al. | 360/77.08 |

FOREIGN PATENT DOCUMENTS 11-134788 * 5/1999 (JP).

* cited by examiner

Primary Examiner—William Klimowicz
(74) Attorney, Agent, or Firm—Woodcock Washburn Kurtz Mackiewicz & Norris LLP

(57) ABSTRACT

Sufficient 1f runout is intentionally generated on tracks on a data storage disk to prevent 2f runout from interfering with the alignment of a read/write head with respect to the tracks. The tip of a disk drive motor spindle is misaligned a predetermined distance with respect to the center of rotation of the disk drive spindle motor, a data storage disk is mounted on the spindle bushing centered on the tip, the data storage disk is spun up to an operational speed, and the read/write head is loaded onto a surface of the data storage disk, thereby generating sufficient 1f runout to prevent 2f runout from interfering with the alignment of the read/write head with respect to the tracks. Alternatively, the spindle bushing can be disposed at a non-perpendicular angle with respect to the axis of rotation of the motor spindle. The 1f runout has a peak amplitude that is at least four times greater than the 2f peak amplitude.

16 Claims, 15 Drawing Sheets

SYSTEM AND METHOD OF SERVO COMPENSATION FOR FRICTION INDUCED OFF TRACK PROBLEM IN A DATA STORAGE DEVICE

FIELD OF THE INVENTION

The present invention relates in general to disk drive data storage devices. More particularly, the present invention relates to methods for improving the seeking and tracking capabilities of a servo system for positioning a read/write head with respect to a track on a disk drive data storage device.

BACKGROUND OF THE INVENTION

In conventional computer data storage systems having a rotating storage medium, data is stored in a series of concentric or spiral tracks across the surface of a disk. Each track includes a number of sectors. The storage medium can comprise, for example, a disk having a surface on which a magnetic material is deposited, such as conventional magnetic disks or magneto-optical disks. The data stored on a disk is represented as a series of variations in magnetic orientation of the disk magnetic material. The variations in magnetic orientation, generally comprising reversals of magnetic flux, represent binary digits of ones and zeroes that in turn represent data. The binary digits are read from the disk surface by a magnetic head transducer suspended over the disk surface that can detect the variations in magnetic orientation as the disk rotates relative to the magnetic head at thousands of revolutions per minute and generate a fluctuating data signal.

Conventionally, the magnetic head is mounted on a disk arm or carriage that is incorporated in a servo system that moves the head, via an actuator, radially in a "seek" or "access" function; i.e., the servo system moves the head to a selected track from a previous track. When the head reaches the desired track, the servo system commences a "track following" function in which it accurately positions the head over the centerline of the selected track and maintains it in that position so that the head can record a series of data bits or, alternatively, retrieve a series of bits from the track as the disk rotates under the head. Thus, the disk drive servo control system controls movement of the arm across the surface of the disk to move the head from track to track and, once over a selected track, to maintain the magnetic head within a given tolerance of distance over the centerline of the desired data track during read or write operations. In a track seek operation, the magnetic head is moved over the disk to a desired one of the tracks. To accurately position the magnetic head at the desired track, it is necessary to determine the track number beneath the head as the disk rotates and the head is moved across the disk.

One such system is a digital sector servo control system that is used to maintain the magnetic read/write head precisely over a desired track during a read or write operation. Such a servo system requires that servo information be prerecorded on the disk file. Servo information can be prerecorded on either a dedicated servo surface or on servo sectors located on each disk surface or on a combination of both.

During both seeking and track following operations, the prerecorded servo information is sensed by the head and demodulated to generate a digital gray code and a position error signal (PES). The digital gray code includes track identification information and the PES indicates the position of the head away from the centerline of a track (i.e., an offset from the center of the track). The digital gray code and the PES are combined together to generate a measured position signal. The measured position signal is then used in a servo feedback loop to generate a control signal to move the head back to the centerline of the target track.

In other words, each disk stores servo information in different sectors of the disk required for positional control. The sector servo method reproduces servo information written on the disk to determine the track number and the exact position of the head relative to the center of the track. A description of a general digital disk file servo control system is given by U.S. Pat. No. 4,679,103 granted to Michael I. Workman and titled "Digital Servo Control System For a Data Recording Disk File".

Servo sectors or bursts are angularly spaced pie-piece-shaped sectors which are interspersed among the data sectors on the data disks. The servo signals may be embedded in the data recorded in servo fields at the beginnings of the data track sectors, for example. Alternatively, the servo signals may be recorded on a disk surface dedicated to servo signals. All of these mechanisms for servo control information are well known to those of ordinary skill in the art. The prerecorded servo information is normally written as servo sectors or bursts to the disks by a servowriter at the factory, before the disks are shipped to users. The prerecorded servo information, including servo bursts, is read from the disks, demodulated, and processed by the servo control system. The results are then applied to the input of the servo electronics which control the current to the actuator such as a voice coil motor (VCM) and thus the radial position of the head over the disk surface.

As described in further detail below, disk drives accept removable disk cartridges that contain a flexible magnetic storage medium upon which information can be written and read. The disk-shaped storage medium is mounted on a hub that rotates freely within the cartridge. A spindle motor within the drive engages the cartridge hub when the cartridge is inserted into the drive, in order to rotate the storage medium at relatively high speeds. The spindle motor does this by first moving from an unloaded position to a loaded position when a disk cartridge is inserted into the disk drive. In the loaded position, the spindle of the disk drive motor contacts the hub of the disk cartridge. The spindle can then be rotated in order to rotate the hub and the storage medium of the disk cartridge. A shutter on the front edge of the cartridge is moved to the side during insertion into the drive, thereby exposing an opening through which the read/write heads of the drive move to access the recording surfaces of the rotating storage medium. The shutter covers the head access opening when the cartridge is outside of the drive, to prevent dust and other contaminants from entering the cartridge and settling on the recording surfaces of the storage medium.

There are several reasons for the position of a read/write head to be in error, or off track, during a track following operation. One of the major components of head position error is called repeatable run out (RRO) at the disk rotating frequency which is an error caused by an unbalanced spindle or by a non-ideal bearing. The Workman U.S. Pat. No. 4,679,103 does not specifically deal with this problem. The servo control system disclosed in the Workman U.S. Pat. No. 4,679,103 does not have sufficient gain at the run out frequency to fully correct for the RRO error.

Particularly where a disk is removable from the drive, the primary source of off track in a removable cartridge disk drive is the misalignment between the center of motor spindle and the hole in the cartridge hub. When there is a misalignment, the center of the circular track on the disk does not coincide with the center of the motor rotation. As a result, the linear actuator has to move towards the center of the disk during half of the revolution and away during the other half in order to follow the track on the disk. This results in a 1 f runout frequency signature. It is typically desirable to reduce the runout.

One of the forces the actuator has to overcome during track following is the friction force between the actuator and the center rod on which the actuator is sliding on. This friction force is against the motion of the actuator. Therefore, every time the actuator changes its direction of motion, the net force change due to friction is twice the amplitude of the friction force. Because of the sudden change in the forces on the actuator and the time it takes for the servo system to learn of this change, the recording head will deviate from the ideal track starting at the direction turn-around for some time. This particular off track is termed friction peak.

Regularly, there are only two friction peaks per every revolution due to two turn-arounds per revolution. Because the friction peaks occur at the fixed angular position per every insertion, the servo systela can be programmed to learn this phenomenon and fix the off track after short learning period. However, complication arises if there exists some significant runout that repeats twice per revolution (i.e., 2f runout). Depending on the ratio of the 1f and 2f runout amplitude, it could occur that there are four directional turn-arounds per revolution giving rises to four friction perk per revolution. For a servo system to handle both the two friction peak case and the four friction peak cases, the programming becomes too complicated.

Thus, oftentimes, there is a transient 2f problem in the PES measurement. This phenomenon is due to changes in the ratio of the amplitudes of the 1f and 2f radial runout which leads to friction in the electromechanical servo system. This friction causes off track error, particularly at the time of a reversal in the direction of motion of an actuator which moves the magnetic head. During some disk insertions, as the tracks are aligned with the motor spindle center line, if runout amplitude becomes reduced and 2f radial runout becomes significant. When sufficiently large 2f runout is present, actuator mechanics experience additional directional reversals over one revolution (e.g., four directional reversals instead of the usual two) which results in additional friction bumps per revolution (e.g., two additional friction bumps). These friction bumps emulate a 2f runout signature and contribute to an apparent 2f radial runout. In other words, the apparent 2f radial runout=the actual 2f radial runout+the signal due to the friction. Thus, the magnitude of the resultant apparent 2f PES amplitude becomes largely independent of the actual 2f radial runout and dependent on the frictional characteristics of the actuator system. Although the actual 2f radial runout remains substantially constant, the apparent 2f radial runout is increased. The apparent 2f radial runout affects the PES (i.e., alters the PES value from its true value to a perceived value), thus causing the head to become misaligned over the disk surface.

Although the art of read/write head positioning is well developed, there remain some problems inherent in this technology, particularly induced friction. Therefore, a need exists for a servo method and system that overcomes the drawbacks of the prior art

SUMMARY OF THE INVENTION

The present invention is directed to systems and methods of intentionally generating sufficient 1f runout on tracks on a data storage disk using a disk drive spindle motor having a motor spindle with a spindle bushing and a tip, and a read/write head, to prevent 2f runout from interfering with the alignment of the read/write head with respect to the tracks.

According to one embodiment of the invention, the tip of the motor spindle is misaligned a predetermined distance with respect to the center of rotation of the disk drive spindle motor; the data storage disk on the spindle bushing is centered on the tip; the data storage disk is spun up to an operational speed; and the read/write head is loaded onto a surface of the data storage disk, thereby generating sufficient 1f runout to prevent 2f runout from interfering with the alignment of the read/write head with respect to the tracks, the 1f runout having a 1f peak amplitude and the 2f runout having a 2f peak amplitude.

Another embodiment within the scope of this invention includes aligning the tip of the motor spindle with the center of rotation of the disk drive spindle motor; disposing the spindle bushing at a predetermined non-perpendicular angle with respect to the axis of rotation of the motor spindle; mounting the data storage disk on the spindle bushing; spinning the data storage disk up to an operational speed; and loading the read/write head onto a surface of the data storage disk, thereby generating sufficient 1f runout to prevent 2f runout from interfering with the alignment of the read/write head with respect to the tracks.

The foregoing and other aspects of the present invention will become apparent from the following detailed description of the invention when considered in conjunction with the accompanying drawings.

DESCRIPTION OF EXEMPLARY EMBODIMENTS AND BEST MODE

The present invention is directed to a system and method for generating a large 1f runout so that the 2f runout problem that is generated by friction as described above is prevented. By generating a large 1f, the 2f runout remains negligible in the determination of the PES. Thus, the read/write head remains properly aligned over the disk surface during track seeking, accessing, and following operations.

By way of background and so that this invention can be more readily understood, an overview of a disk and disk drive is provided.

Disk

Figure 1:
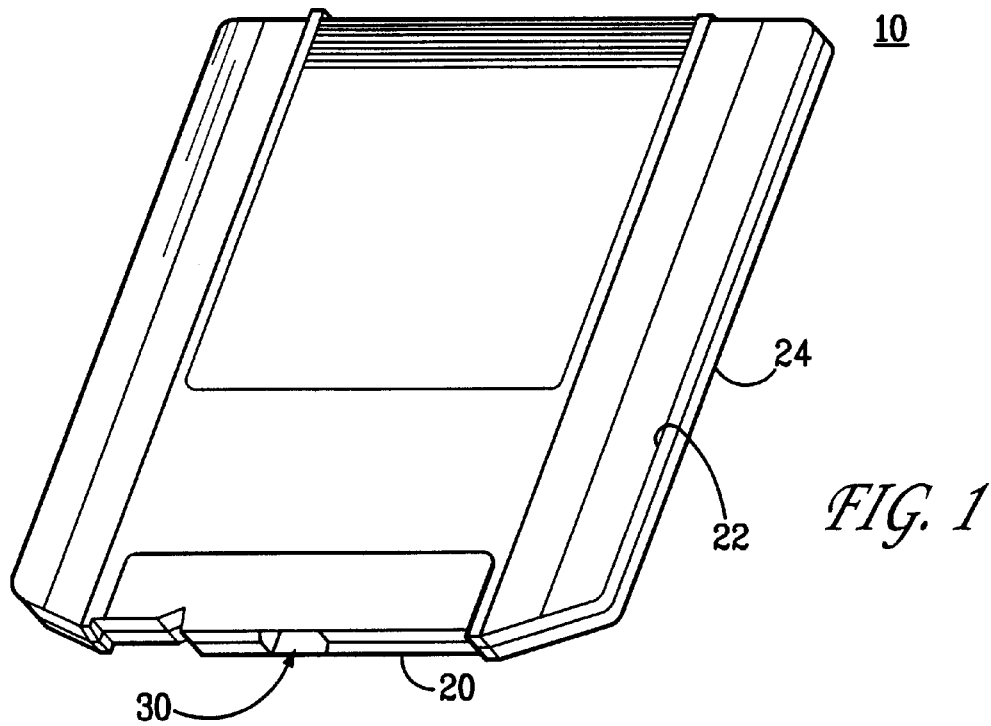
FIG. 1 depicts a disk cartridge adapted for use with a preferred embodiment of this invention.
Figure 2:
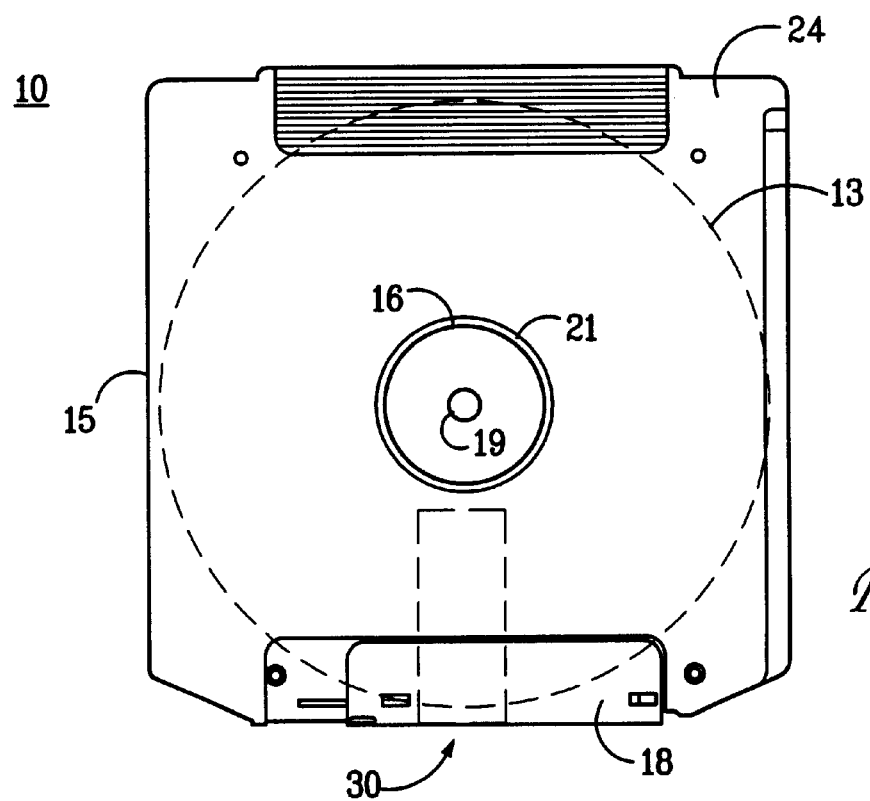
FIG. 2 is a bottom view of the disk cartridge of FIG. 1.

FIGS. 1 and 2 depict an exemplary disk cartridge 10 adapted for use in the disk drive 12 (shown in FIG. 3) of this invention. In a preferred embodiment, the disk cartridge 10 may be a ZIP™ disk cartridge produced by Iomega Corporation. However, the disk drive 12 of this invention is not limited to these disk cartridges and a variety of other standard disk cartridges may be employed with various features of the disk drive of this invention. As shown, the exemplary disk cartridge 10 has an upper and a lower shell 22, 24 that mate to form an outer casing 15. In a preferred embodiment, the shells 22, 24 are plastic. Rotatably mounted in the casing 15 is a hub 16. There is a circular hole 19 in the center of the hub 16. A disk shaped information storage medium 13 is affixed to the hub 16 to create a disk/hub assembly 13/16. In a preferred embodiment, the storage medium 13 is a flexible magnetic storage medium. However, in other embodiments, the storage medium may be a rigid magnetic disk, a magneto-optical disk, or an optical storage medium. An aperture 21 in the lower shell 22 of the casing 15 provides access to the disk hub 16. A head opening 30 in the front peripheral edge of the disk cartridge 10 provides access to the surfaces of the storage medium 13 for the read/write head(s) 38 of the disk drive 12.

As depicted in FIG. 2, a shutter 18 is also provided on the front peripheral edge of the disk cartridge 10 to cover the head access opening 30 when the cartridge 10 is not in use. When a disk cartridge 10 is inserted into the disk drive 12, the shutter 18 moves to the side and exposes the head access opening 30. This provides access for the read/write heads 38 to the storage medium 13.

Disk Drive

Figure 3:
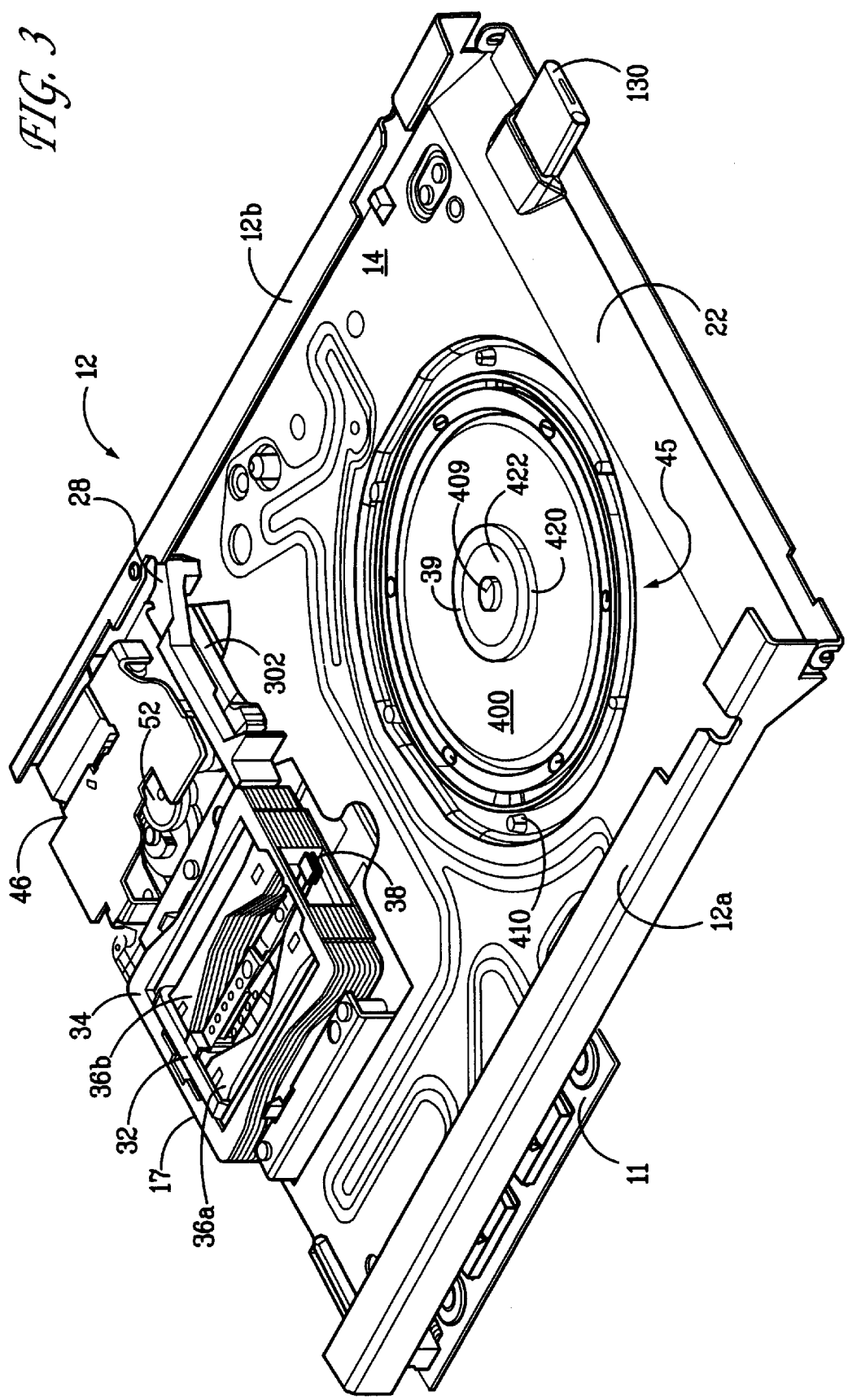
FIG. 3 is an isometric view of a top of a disk drive according to a preferred embodiment of this invention.
Figure 4:
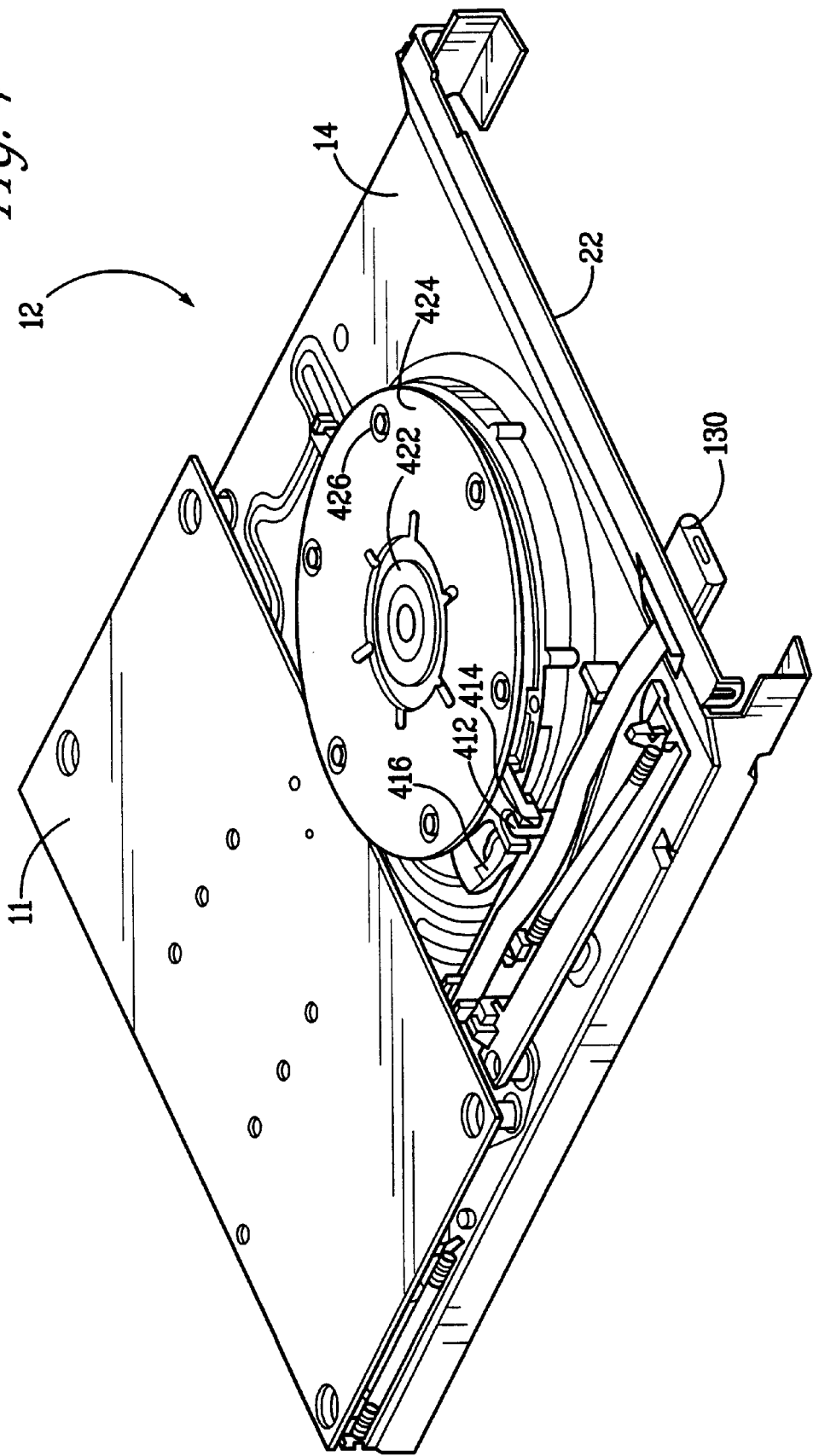
FIG. 4 is an isometric view of the bottom of the disk drive of FIG. 3 with a circuit board installed.
Figure 5:
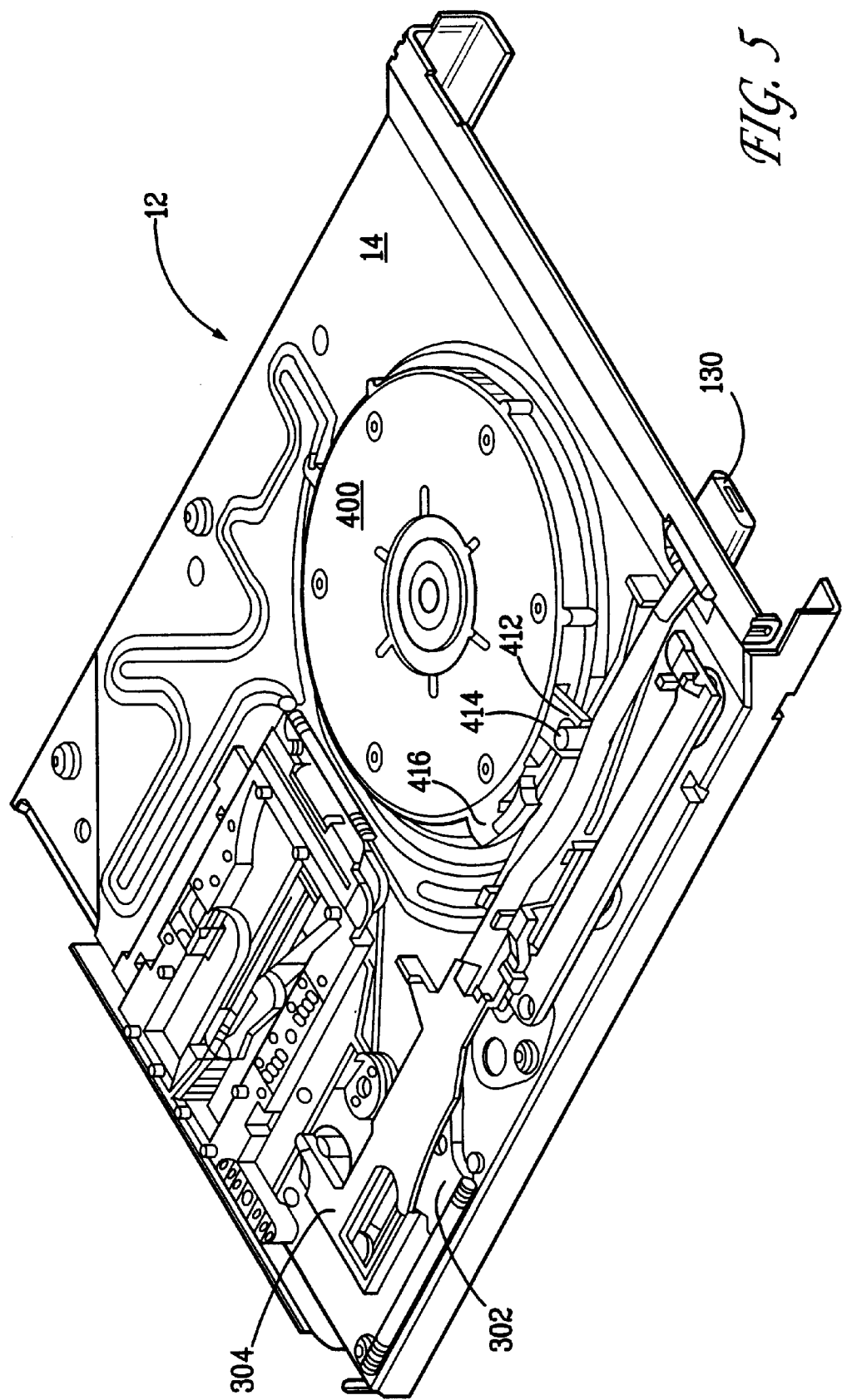
FIG. 5 is an isometric view of the bottom of the disk drive of FIG. 3 with the circuit board removed.

FIGS. 3–5 depict an exemplary disk drive 12 of the present invention. The disk drive 12 can be employed with a microprocessor in either a stationary personal computer or a portable personal computer, such as a laptop computer. The methods of this invention can be used with any type of disk drive, including the type employed in a laptop computer, stand alone disk drives, and disk drives included within a casing, a slot or a bay, such as an office type computer.

FIG. 3 is a top isometric view of the disk drive 12 with the cover (not shown) of the disk drive removed. FIG. 4 is a bottom isometric view with a circuit board installed, and FIG. 5 is a bottom isometric view of the disk drive 12 with the circuit board removed. The disk drive 12 comprises a chassis 14 having u-shaped outer edges that form opposed guide rails 12a, 12b that guide a removable disk cartridge into the disk drive 12 through an opening 22. In the present embodiment, the chassis 14 is metallic.

A cartridge shutter lever 28 and an eject lever 302 are rotatably mounted on the chassis 14. Both of the levers 28, 302 are shown in FIG. 3 in the positions that they occupy when a disk cartridge is fully inserted into the disk drive 12. During cartridge insertion, the shutter lever 28 and the eject lever 302 swing from a forward position to the position shown in FIG. 3. During this movement, an abutment surface on the shutter lever 28 engages the shutter 18 of the disk cartridge 10, and moves the shutter 18 to the side, exposing the head access opening 30 in the front peripheral edge of the cartridge 10.

As mentioned above, the eject lever 302 also moves from a forward position to the position shown in FIG. 3 when a disk cartridge 10 is inserted. In the position shown in FIG. 3, the eject lever 302 is held in a cocked position against spring tension. When it is desired to eject a disk cartridge 10 from the drive 12, an eject button 130 is pushed. Among other things, this causes the eject lever 302 to be released from its cocked position, so that it springs forward to force the disk cartridge 10 to eject out of the disk drive 12.

The disk drive 12 also has a linear actuator 17 disposed at the rear of the chassis 14. The linear actuator 17 comprises a carriage assembly 32, an outer magnet return path assembly 34, and two inner return paths 36a, 36b disposed on opposite sides of the carriage assembly 32. After a disk cartridge 10 is inserted into the disk drive 12, the carriage assembly 32 carries a pair of read/write heads 38 over the recording surfaces of the disk-shaped storage medium 13 within the cartridge 10. A motor 400, such as a spindle motor, is provided on the floor of the chassis 14. During cartridge insertion, the motor 400 is translated vertically into engagement with a hub 16 of the disk cartridge 10, in order to rotate the disk-shaped storage medium at a relatively high speed. As shown in FIG. 4, a circuit board 11 is attached to the chassis 14 via a plurality of standoffs (not shown). The circuit board 11 carries the drive circuitry. A gear train 52 controls movement of the eject lever 302 and movement of a head retraction system that moves the carriage assembly 32 to a parked position to prevent damage to the read/write heads 38, when the disk drive is not in use.

As is known in the art, a typical disk drive has an eject system for ejecting a disk cartridge from a disk drive. A typical disk drive also contains a head retraction system for holding the disk drive heads in a retracted position with respect to a disk cartridge. In this retracted position, the heads are typically disposed in the rear of a disk drive to minimize the likelihood of damage to the heads through accidental contact. In addition to having an eject system and a head retract system, a typical disk drive has an operating system for controlling the operation of the eject system and the head retraction system. Moreover, a conventional disk drive may have a motor system for engaging the disk drive motor 400 with the disk cartridge hub 16.

Disk Drive Motor

By way of background and so that this invention can be more readily understood, an overview of the disk drive motor and operation of the motor loading system of the disk drive 12 is provided. The disk drive 12 of this invention may have a motor loading system 45 that includes an inner motor ring 401 disposed on a disk drive motor 400 and an outer motor ring 404 disposed on the chassis 14. The primary function of these rings are to engage the disk drive motor 400 with a disk cartridge 10 when loaded into the disk drive 12, and to disengage the disk drive motor 400 from a disk cartridge 10 so that the cartridge 10 can be ejected from the disk drive 12.

Figure 6:
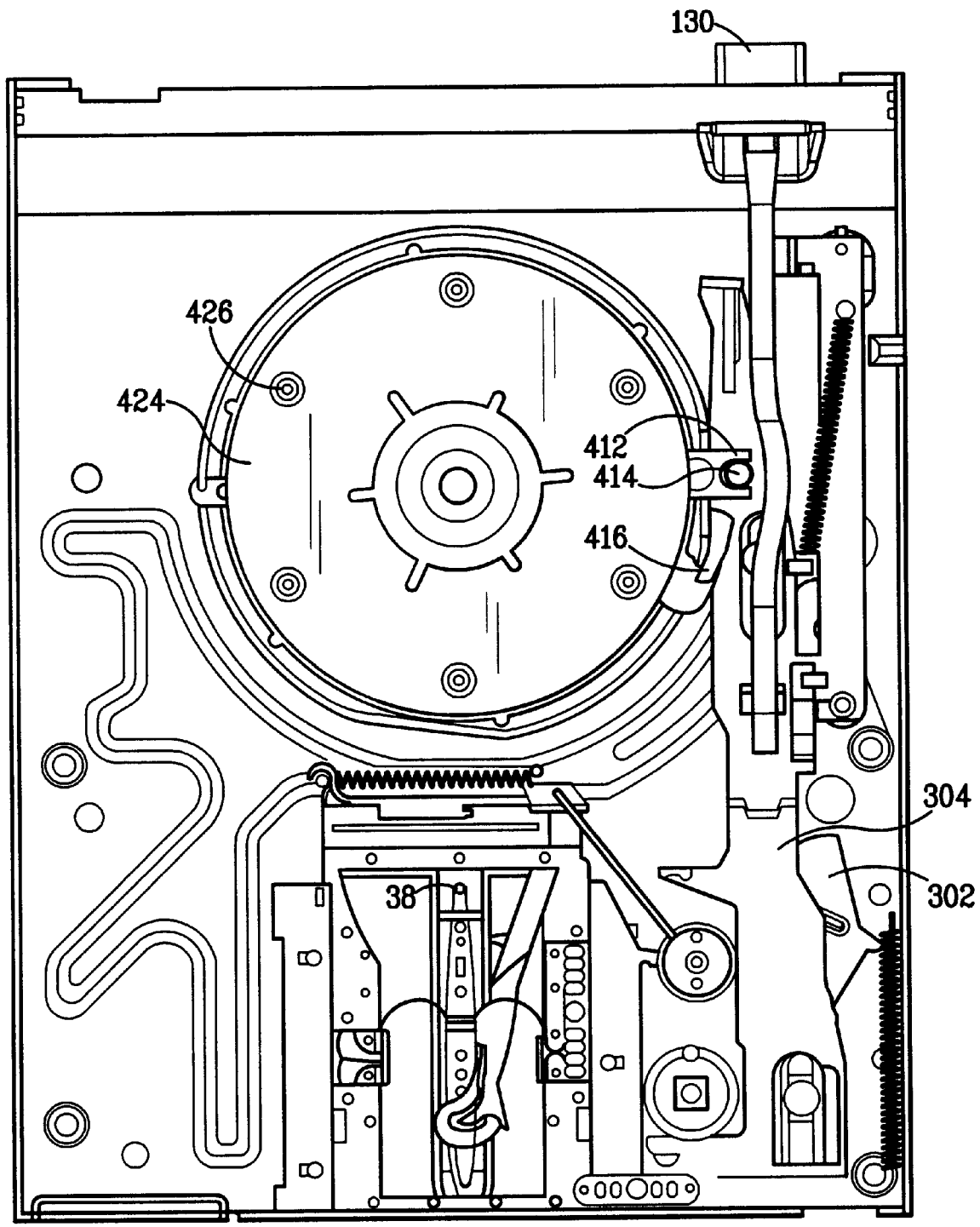
FIG. 6 is a bottom view of the disk drive of FIG. 3.

This disk drive motor 400 may be a spindle motor that interacts with the hub 16 of a disk cartridge depicted in FIG. 2. The motor 400 may be circular in shape, as shown in FIG. 3, to facilitate engagement with the hub 16. The disk drive motor 400 is preferably mounted on a rotatable shaft or spindle 409. In a preferred embodiment, the disk drive motor 400 is attached to the shaft 409 with an interference fit, but other known methods of attachment may be used. A bushing 420 may be placed on the shaft above the motor 400 for engaging the hub 16 of a disk cartridge 10. Washers 422 may be disposed on the shaft above and below the motor 400 to retain the motor 400 on the shaft 409. These washers 422 may also be attached to the shaft 409 with an interference fit. A cover plate 424 may be affixed to the lower portion of the disk drive motor 400, as shown in FIGS. 4 and 6, for example.

In a preferred embodiment, the disk drive motor 400 has an inner motor ring 401 with threads 402 running around the circumference. This inner motor ring 401 is preferably constructed from plastic or another suitable material. The inner motor ring 401 may be connected to the cover plate 424 with heat stakes 426 as shown in FIGS. 4 and 6–12. Alternatively, fasteners, adhesives or a variety of other fastening techniques may be employed.

The threads 402 of the inner motor ring 401 are adaptable to mate with a threaded outer motor ring 404 disposed in a cavity 406 in the chassis 14. The outer motor ring 404 is also preferably constructed from plastic or another suitable material. The outer motor ring 404 may have a plurality of detents 408 extending radially from an outer surface. These detents 408 can be mated with an interference fit to a plurality of indentations 410 in the chassis 14. Other known methods of fastening may be employed.

Extending from the inner motor ring 401 may be a slotted member 412. In the preferred embodiment shown in FIGS. 4, 5 and 7–12, the slotted member 412 extends approximately parallel to the chassis 14. The slotted member 412 functions to interact with a drag link post 414 extending from the drag link 304 to load and unload the disk drive motor 400. The slotted member 412 may be molded to the inner motor ring 401 or attached with other known fastening methods.

Affixed to the outer motor ring 404 is a motor snap 416. In the preferred embodiment shown in FIGS. 4–12, the motor snap 416 is a cantilever beam that functions as a spring when inserting the disk drive motor 400. When a disk drive motor 400 is inserted, the motor snap 416 functions to prevent rotation of the disk drive motor clockwise as viewed in FIGS. 4, 5 and 7–12 This prevents the disk drive motor 400 from becoming disconnected from the chassis 14 in the event the disk drive motor 400 is forced to rotate in the clockwise direction. Because the motor snap 416 prevents the disk drive motor 400 from becoming dislodged from the chassis 14, it permits the disk drive motor 400 to remain assembled to the chassis 14 as it moves between an unloaded and a loaded position. Without the motor snap 416, either a more complex attachment mechanism requiring a relatively more complex assembling process would be required or the disk drive motor 400 would not have a means for preventing it from becoming dislodged.

FIGS. 7–12 depict the motor assembling sequence. By way of overview, during the assembling sequence the disk drive motor 400 is inserted into and connected to the disk drive 12 where it rests in an unloaded position. In the unloaded position, the disk drive motor 400 is not coupled to a disk cartridge 10. When a disk cartridge 10 is inserted into the disk drive 12, the disk drive motor 400 can then be moved to its loaded position. In the loaded position, the disk drive motor 400 engages the disk cartridge 10 to rotate its storage medium. When the disk cartridge 10 is ejected from the disk drive 12, the disk drive motor 400 is moved back to its unloaded position.

Figure 9:
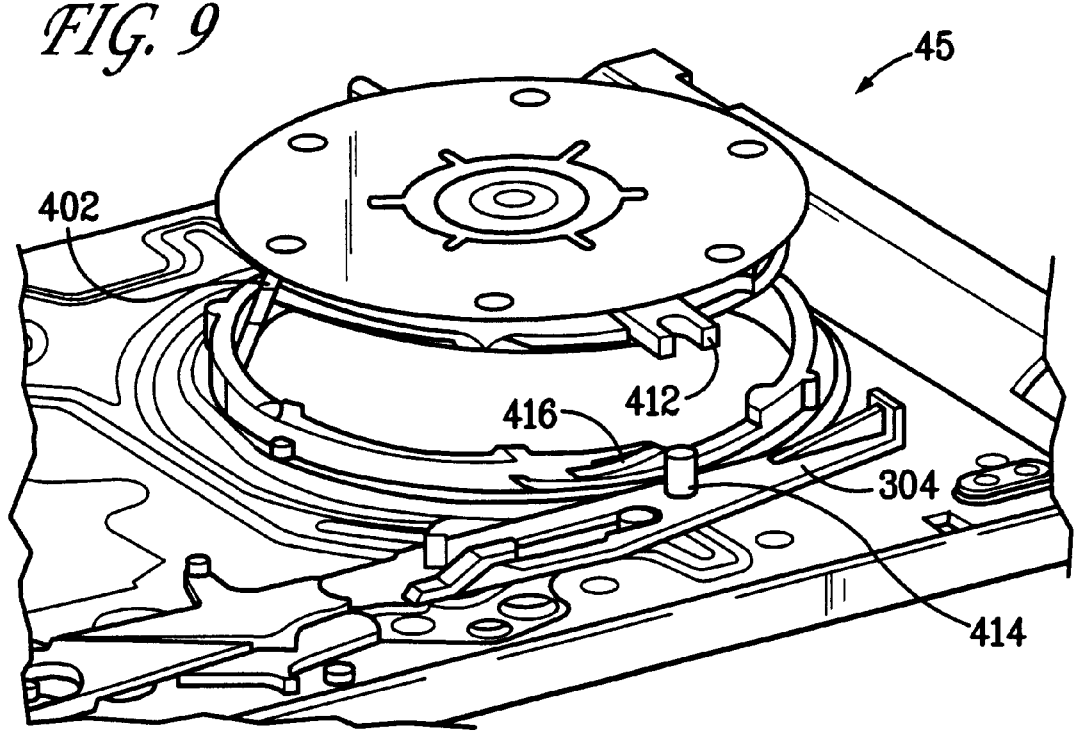
FIG. 9 is an isometric view of a portion of the motor loading system in a third position.
Figure 10:
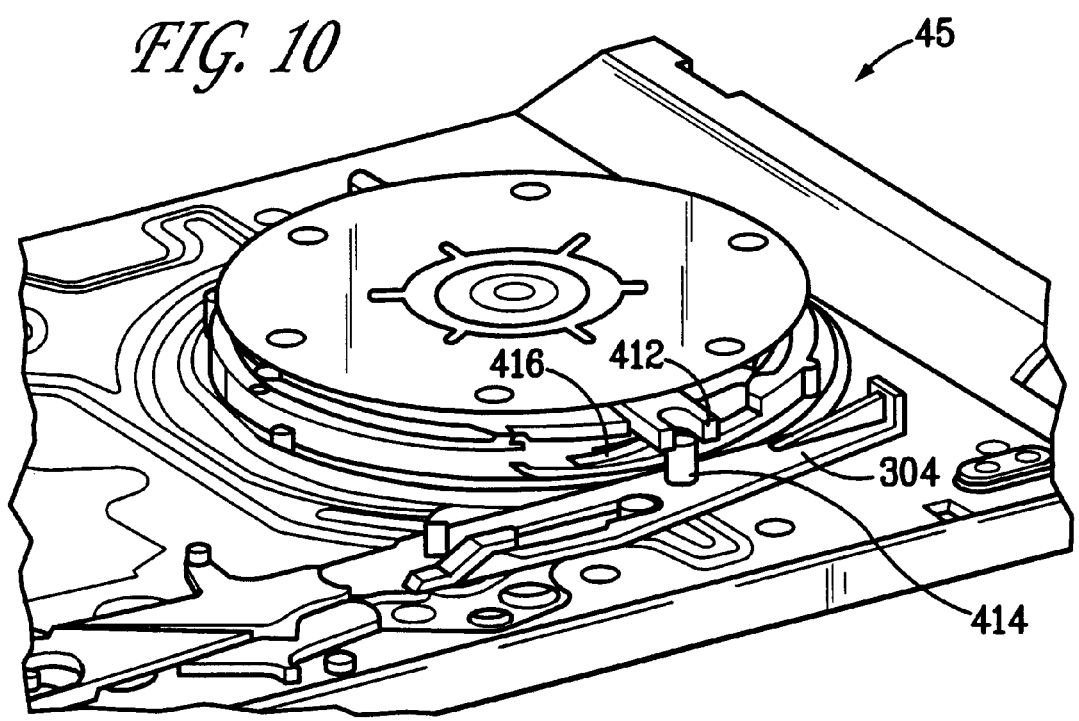
FIG. 10 is an isometric view of a portion of the motor loading system in a fourth position.

FIG. 9 illustrates the disk drive motor 400 being inserted into the disk drive 12. As the disk drive motor 400 is inserted, the threads of the inner motor ring 401 are engaged to the threads disposed on the outer motor ring 404, as shown in FIG. 10. Additionally, the slotted member 412 is fit over the drag link post 414 and over the motor snap 416. Upon engaging the motor snap 416, the slotted member 412 deflects the motor snap 416 towards the chassis 14.

Figure 11:
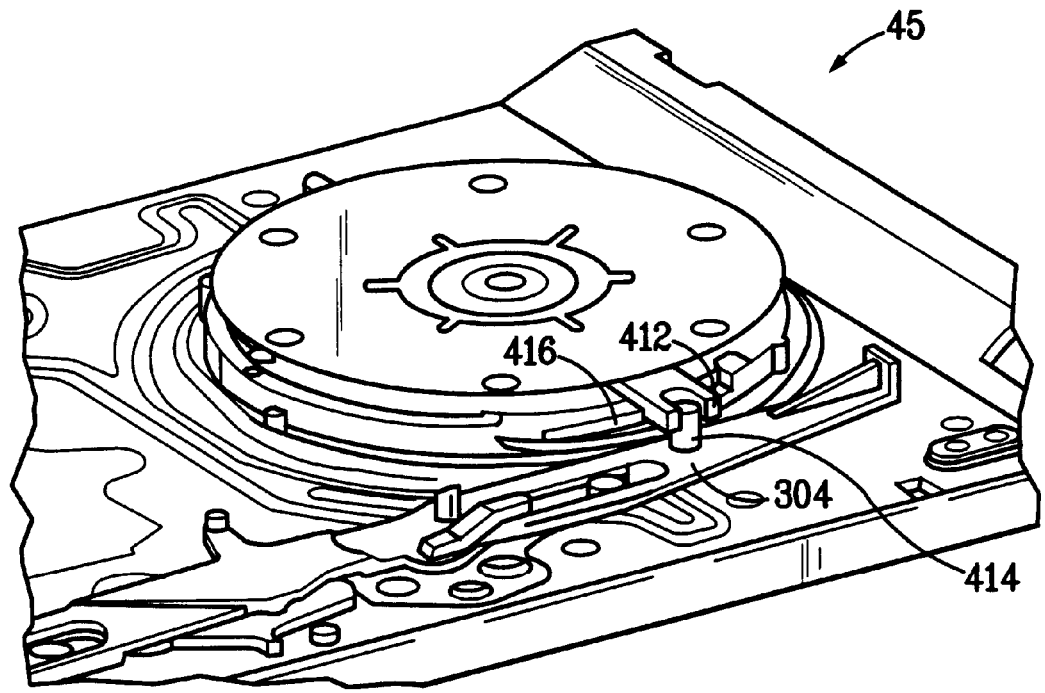
FIG. 11 is an isometric view of a portion of the motor loading system of FIG. 7.

As shown in FIG. 11, the disk drive motor 400 is then rotated counter clockwise to mate the threads of the inner motor ring 401 with the threads of the outer motor ring 404. As the rings are mated, the disk drive motor 400 moves towards the top of the disk drive 12. During rotation of the disk drive motor 400, the slotted member 412 pulls the drag link 304 because of its engagement with the drag link post 414. The motor snap 416 becomes uncovered by the slotted member 412 as the disk drive motor 400 is rotated, as shown in FIG. 11. When uncovered, the motor snap 416 springs from its deflected position to its undeflected position. In its undeflected position, the motor snap 416 rests near the slotted member 412. Since the motor snap 416 is affixed to the outer motor ring 401, it cannot rotate. Thus, the slotted member 412 cannot rotate in the counter clockwise direction past the motor snap 416 as viewed in FIGS. 9–12 because it will engage the fixed motor snap 416. Furthermore, since the inner motor ring 401 is attached to the slotted member 412 it cannot rotate in this direction either.

Figure 7:
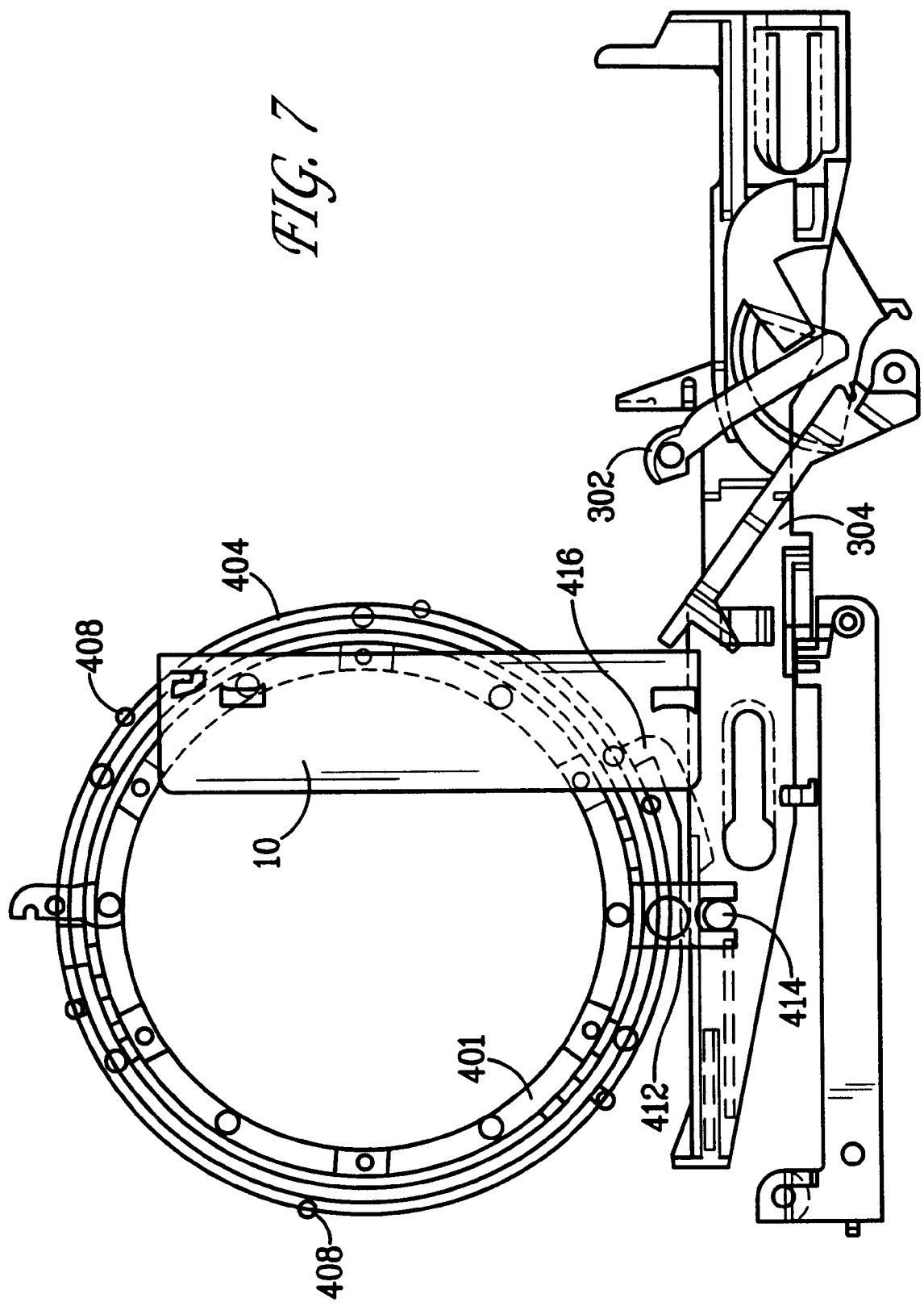
FIG. 7 is a diagrammatical view of a portion of a motor loading system according to a preferred embodiment of this invention in a first position.
Figure 8:
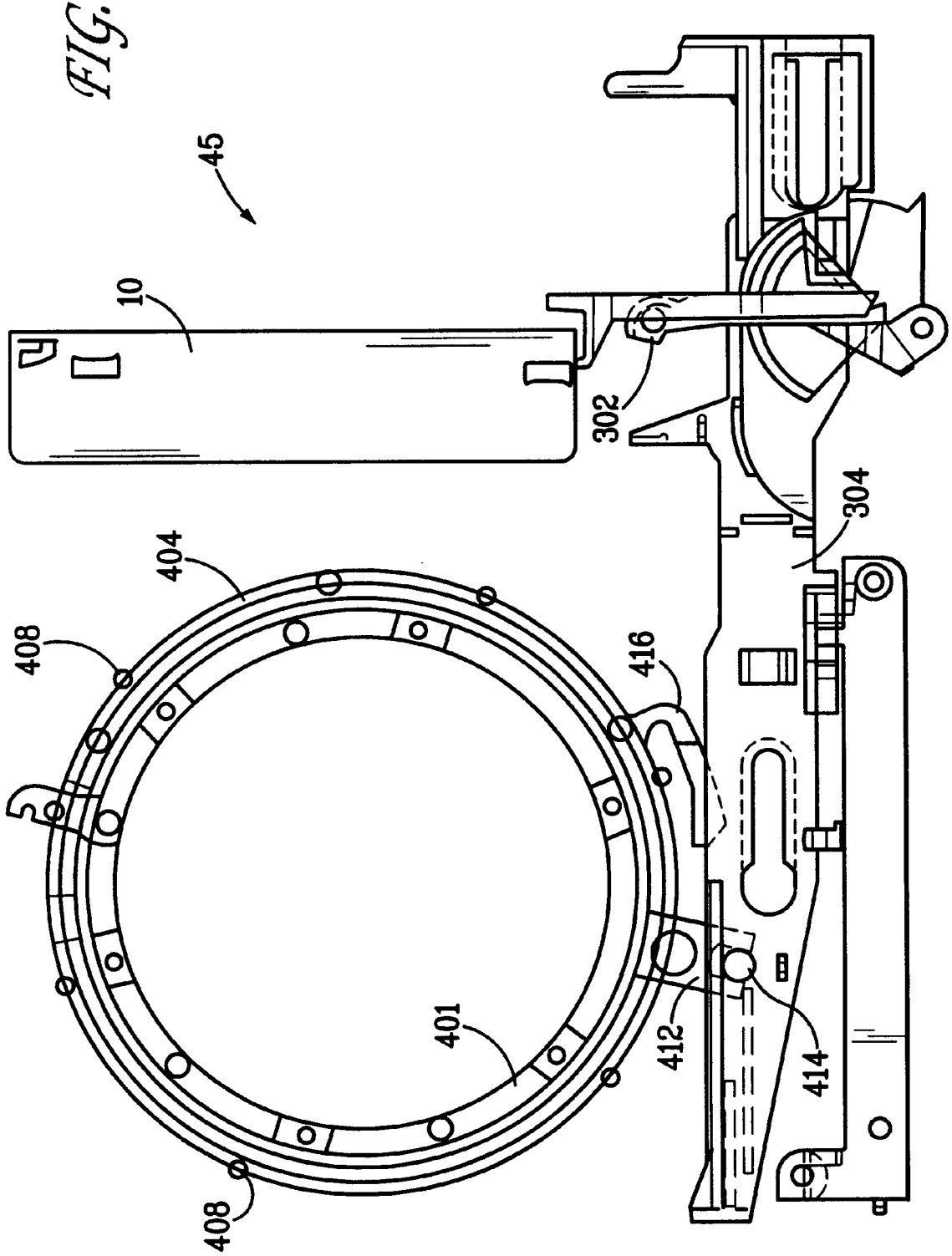
FIG. 8 is a diagrammatical view of the portion of the motor loading system of FIG. 7 in a second position.

After insertion, the disk drive motor 400 is not in a position to engage a loaded disk cartridge. This position is referred to as the unloaded position. The unloaded position of the inner motor ring 401, the outer motor ring 404, the slotted member 412 and the motor snap 416 are depicted in FIG. 7. The threads of the disk drive motor 400 can be rotated further in the clockwise direction as viewed in FIG. 7 to move the disk drive motor 400 to a loaded position where it can engage a loaded disk cartridge.

Figure 12:
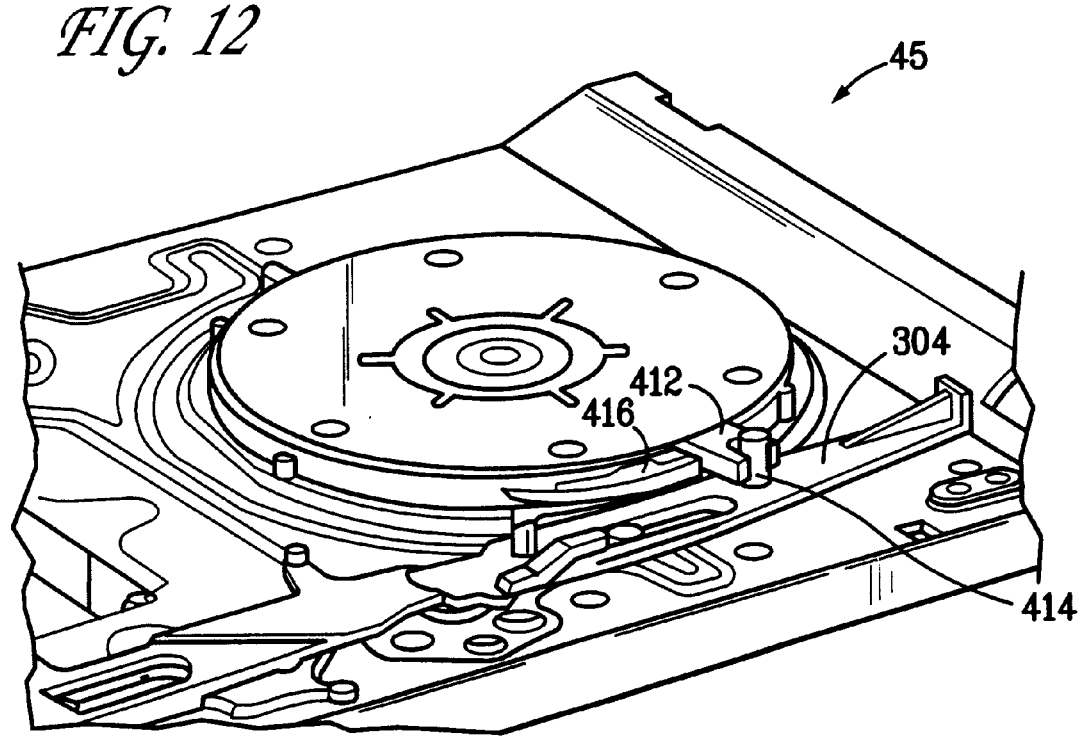
FIG. 12 is an isometric view of a portion of the motor loading system of FIG. 8.

The disk drive motor 400 can be moved from the unloaded position to the loaded position as follows. As discussed in detail above, when a disk cartridge 10 is inserted into a disk drive 12, the drag link 304 translates towards the front of the disk drive 12 in response to rotation of the eject lever 302. As the drag link 304 translates, the drag link post 414 pushes the slotted member 412 and drive the inner motor ring 401 to rotate in a clockwise direction, as depicted in FIG. 12 and a counter clockwise direction as viewed in FIGS. 7 and 8. Upon rotating with the inner motor ring 401, the disk drive motor 400 is driven towards the top of the disk drive 12 into its loaded position where it enters the aperture 21 of the disk cartridge 10 and engages the hub 16 of the disk cartridge 10. In this position, the disk drive motor 400 can rotate the hub 16 to operate the disk cartridge 10 for storage and retrieval of information.

In order to unload the disk drive motor 400, the operating system 46 described above operates in conjunction with the eject system to translate the drag link 304. As the drag link 304 translates, the drag link post 414 interfaces with the slotted member 412 to drive the disk drive motor 400 to rotate about the outer ring 404 in a clockwise direction as viewed in FIG. 12. As the disk drive motor 400 rotates it moves to the unloaded position, shown in FIGS. 7 and 11 and disengages from the aperture 21 and the hub 16 of the disk cartridge 10.

If the disk drive 12 is subject to a dynamic force, such as mechanical shock, the disk drive motor 400 has the potential to rotate and become dislodged from the chassis 14. This could happen if the disk drive motor 400 rotates past the point where the threads of the inner motor ring are mated with the threads of the outer motor ring. In order to prevent this, the motor snap 416 prevents the disk drive motor 400 from rotating to the point where it becomes dislodged from the chassis 14. The motor snap 416 also facilitates loading the disk drive motor 400 because it is flexible. It is preferably flexible because it interferes with the insertion of the disk drive motor 400. The motor snap 416 interferes with the insertion of the disk drive motor 400 because it must be located at a certain point along the outer motor ring to prevent rotation of the motor 400 past this certain point. Additionally, the slotted member 412 must be disposed along the inner motor ring at a certain point so that it can interface with the drive link post 414. Because of the location of these components, the motor snap 416 interferes with the slotted member 412 upon inserting the disk drive motor 400 into the chassis 14. In order to facilitate the insertion of the disk drive motor 400, the motor snap 416 is flexible so that it can deflect upon insertion of the disk drive motor 400. After the disk drive motor 400 has been inserted and has been rotated, the motor snap 416 can then deflect back to its original position and prevent rotation of the disk drive motor 400 past a certain point where it would become dislodged from the chassis 14.

Because the motor snap 416 may be integral with the outer motor ring, it can be manufactured relatively easily through a molding or similar process. Additionally, a motor snap 416 that is integral with the outer motor ring facilitates insertion of the disk drive motor 400.

Figure 13:
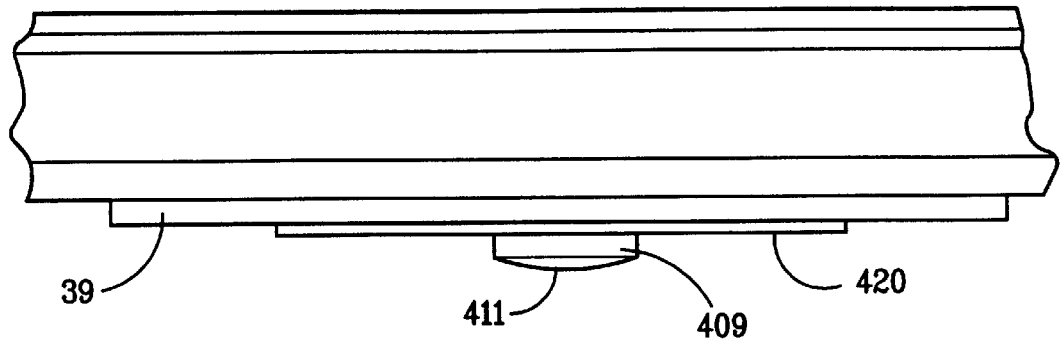
FIG. 13 is a diagrammatical view of a disk drive spindle motor that can be used with a preferred embodiment of this invention.

The spindle 409 and spindle tip 411 extend above the disk drive motor 400 to engage the hub 16 of the disk cartridge 10. In the disk drive 12, the tip 411 of the spindle 409 takes the form of a dome as illustrated in FIG. 13. However, the spindle tip 411 can be any shape, such as conical. From FIGS. 13 and 14, it is apparent that the spindle 409 of the disk drive motor 400 can fit within the disk hub hole 19. When disposed within the disk hub hole 19, the spindle 409 contacts the hub 16, as shown in FIG. 15, and the hub 16 is detachably mounted on a bushing 420 of the spindle 409. The spindle 409 can be rotated, and therefore, rotation of the spindle 409 when engaged with the hub 16 will cause rotation of the hub 16 and the storage medium 13. A magnet 39 of the disk drive motor 400 is preferably used to pull the hub 16 towards a centered position on the bushing 420.

Figure 16:
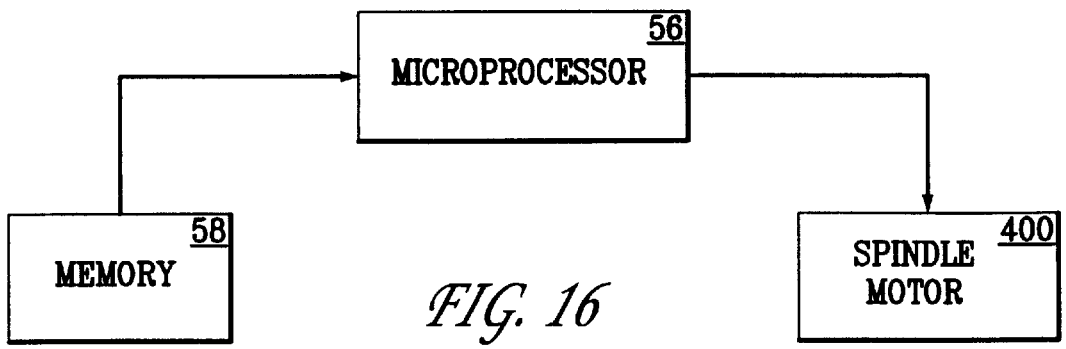
FIG. 16 is a schematic diagram of a preferred embodiment of the system of this invention.

Rotation of the spindle 409 is controlled by a microprocessor 56, which is in turn controlled by a computer memory or storage device 58 that contains programmed code and data, as shown in FIG. 16. The memory 58 may be read only memory (ROM). After a disk cartridge 10 has been inserted into the disk drive 12, the microprocessor 56 sends power to the motor 400 to cause the disk drive motor 400, and in particular the spindle 409, to rotate. This occurs after the disk drive motor 400 has moved to its loaded position, as described above. This is commonly referred to as motor "spin-up."

Disk Rotation

Figure 14:
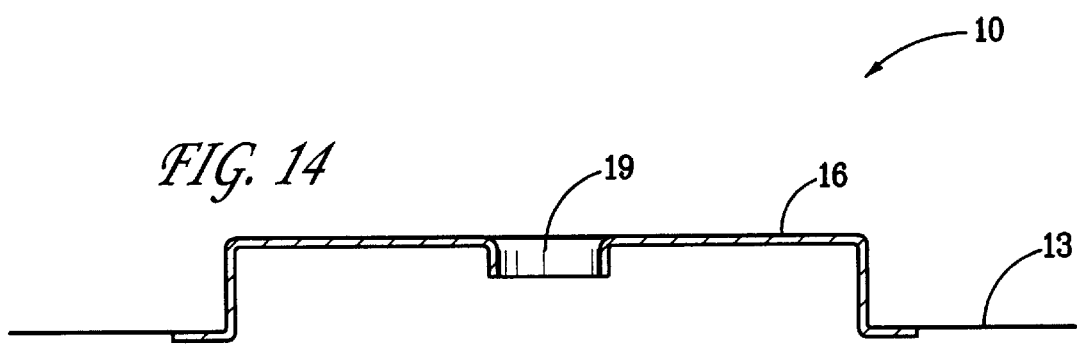
FIG. 14 is a cross-sectional view of a portion of the disk cartridge of FIG. 1.
Figure 15:
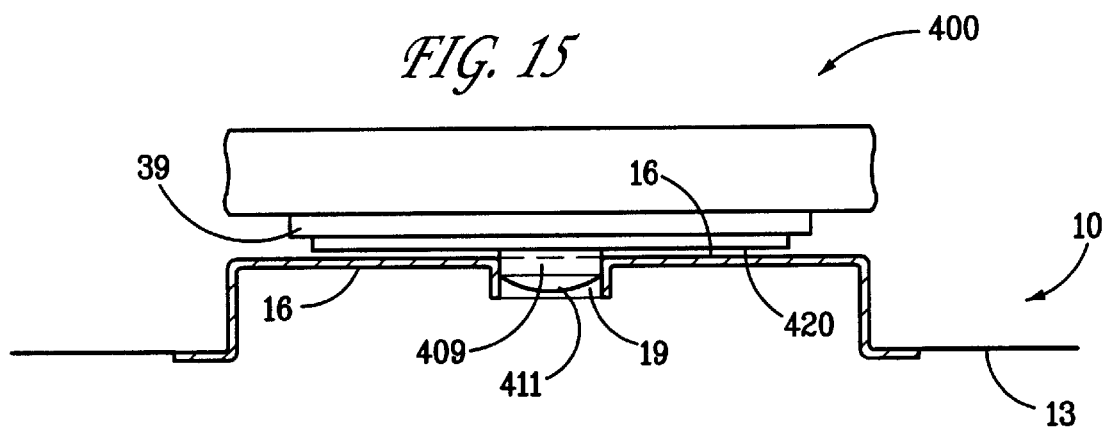
FIG. 15 is a diagrammatical view of a disk drive motor that is engaged with a hub of a disk.

In order for the spindle 409 to rotate the disk hub assembly 13/16 properly, the spindle 409 is typically centered on the disk hub hole 19, as shown in FIGS. 14 and 15. If the spindle 409 is not centered and does not enter the disk hub hole 19, the spindle 409 will contact the hub 16 as it rotates and cause the hub 16 and the attached storage medium 13 to rotate in an unstable pattern. This causes the typically undesirable runout error or disturbance that is periodic at the frequency of the rotation of the disk. Various frequency signatures can have runout problems, such as 1f runout or 2f runout. In accordance with the present invention, however, 1f runout is desirable and is not to be prevented or decreased.

Figure 17A:
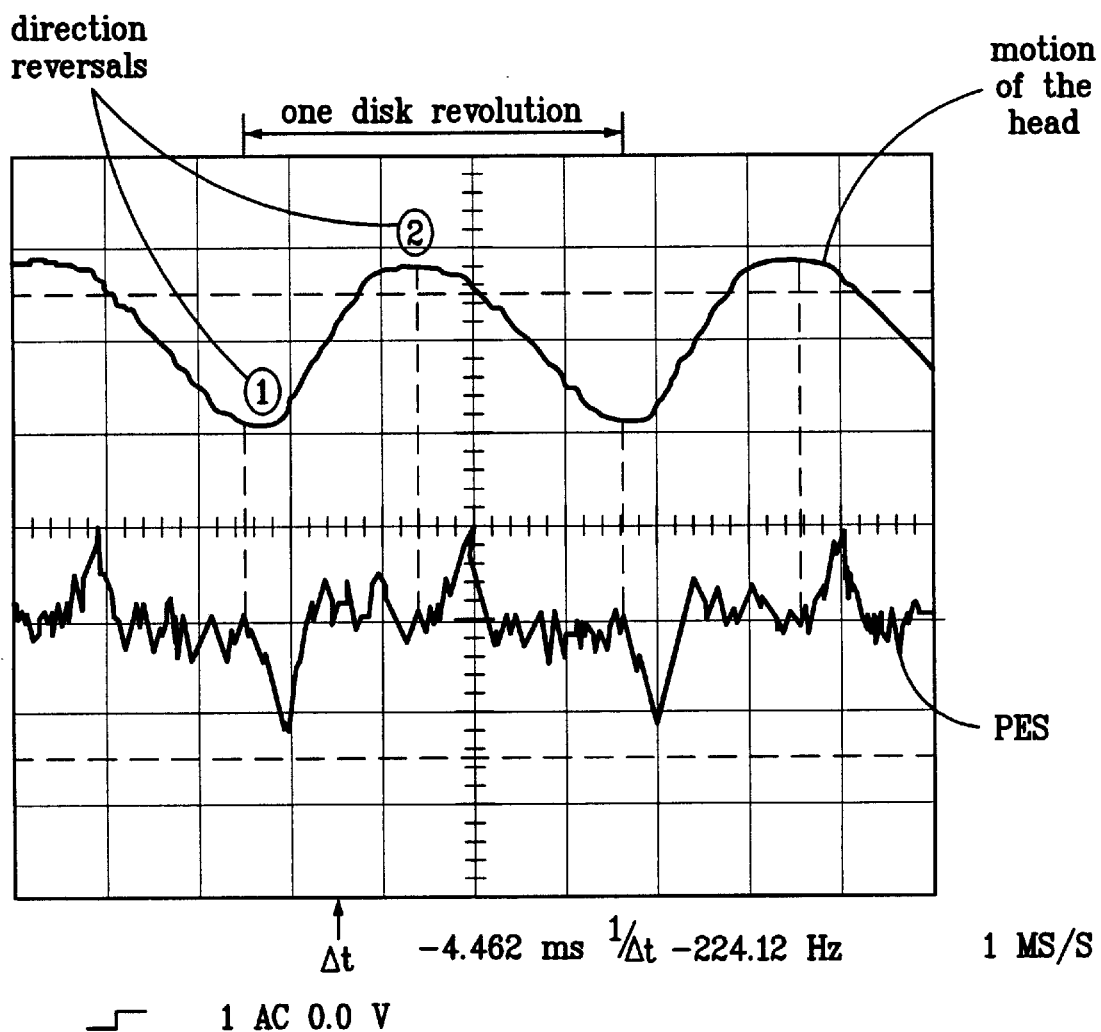
FIGS. 17A and 17B show graphs of a dominant 1f runout actuator motion.
Figure 17B:
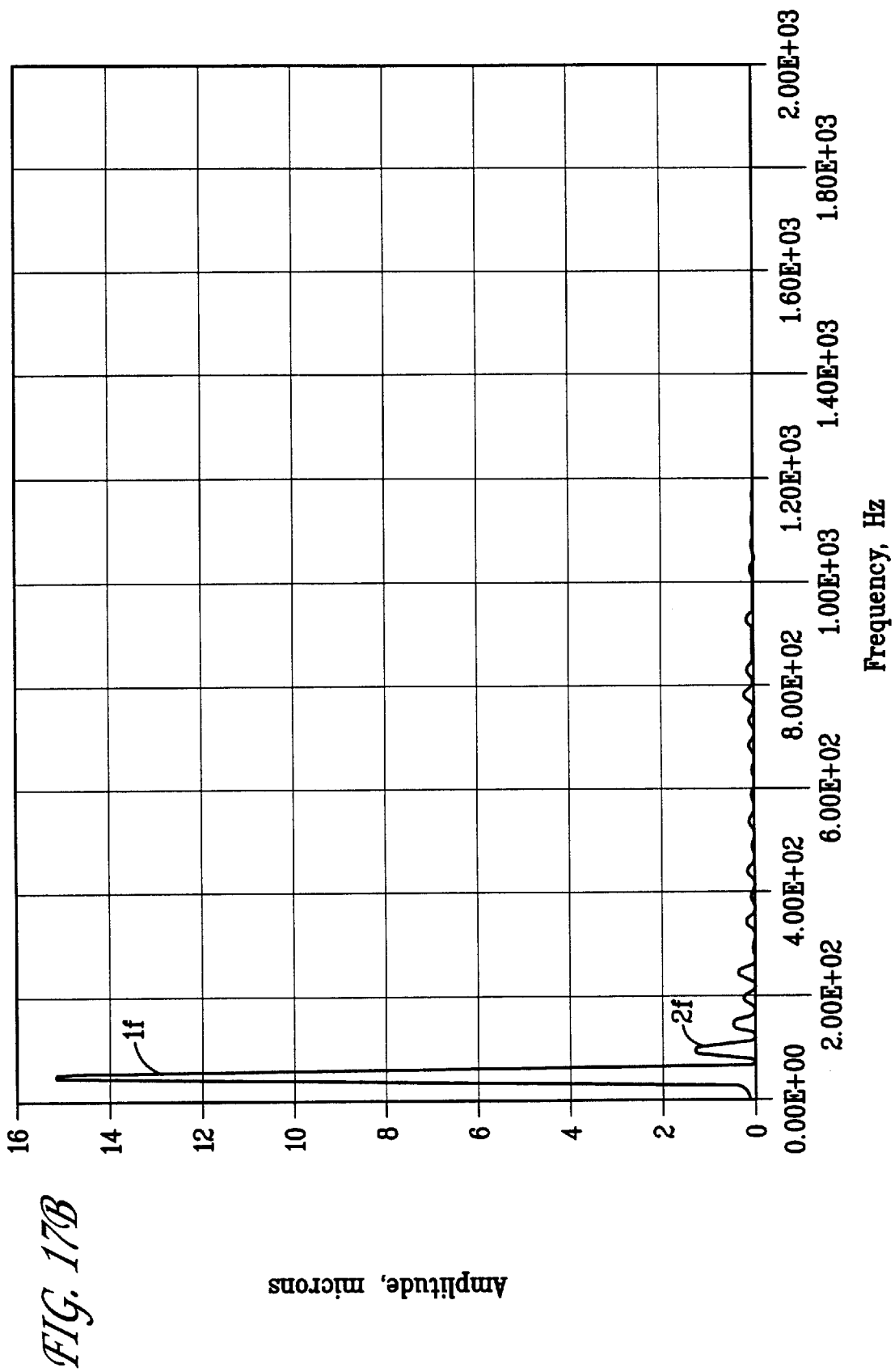

When 1f runout is dominant, a PES trace and head trace closely track one another as shown in FIG. 17A. The actuator motion tends to stagnate at the turnaround point as the servo system attempts to overcome the sudden deficit in friction force associated with a change in the direction of the actuator motion, which leads to a sharp PES peak. FIG. 17B shows the relative amplitudes of 1f and 2f. It should also be noted that the amplitude of the actuator motion is about 16 microns (4.5 volts with 3.5 micron/volt sensitivity) in this case. 1f runout is clearly dominant, and the ratio of 1f/2f is about 11.5.

2f runout is caused by anisotropic hygroscopic and thermal expansion and anisotropic heat shrinkage of the flexible disk media. When the 2f runout is large enough with respect to the 1f runout, the actuator mechanics experience additional directional reversals over one revolution (e.g., four directional reversals instead of the usual two). These addition directional reversals increase the likelihood and severity of write-over encroachment and off-track error.

Friction in the actuator mechanics also contributes to off-track error, particularly when the directional reversals of the actuator take place. Thus, off-track error is, among other things, a function of 1f runout, 2f runout, and friction. The off-track error is most severe when the amplitude of the 2f runout and friction is large with respect to the 1f runout.

Figure 18A:
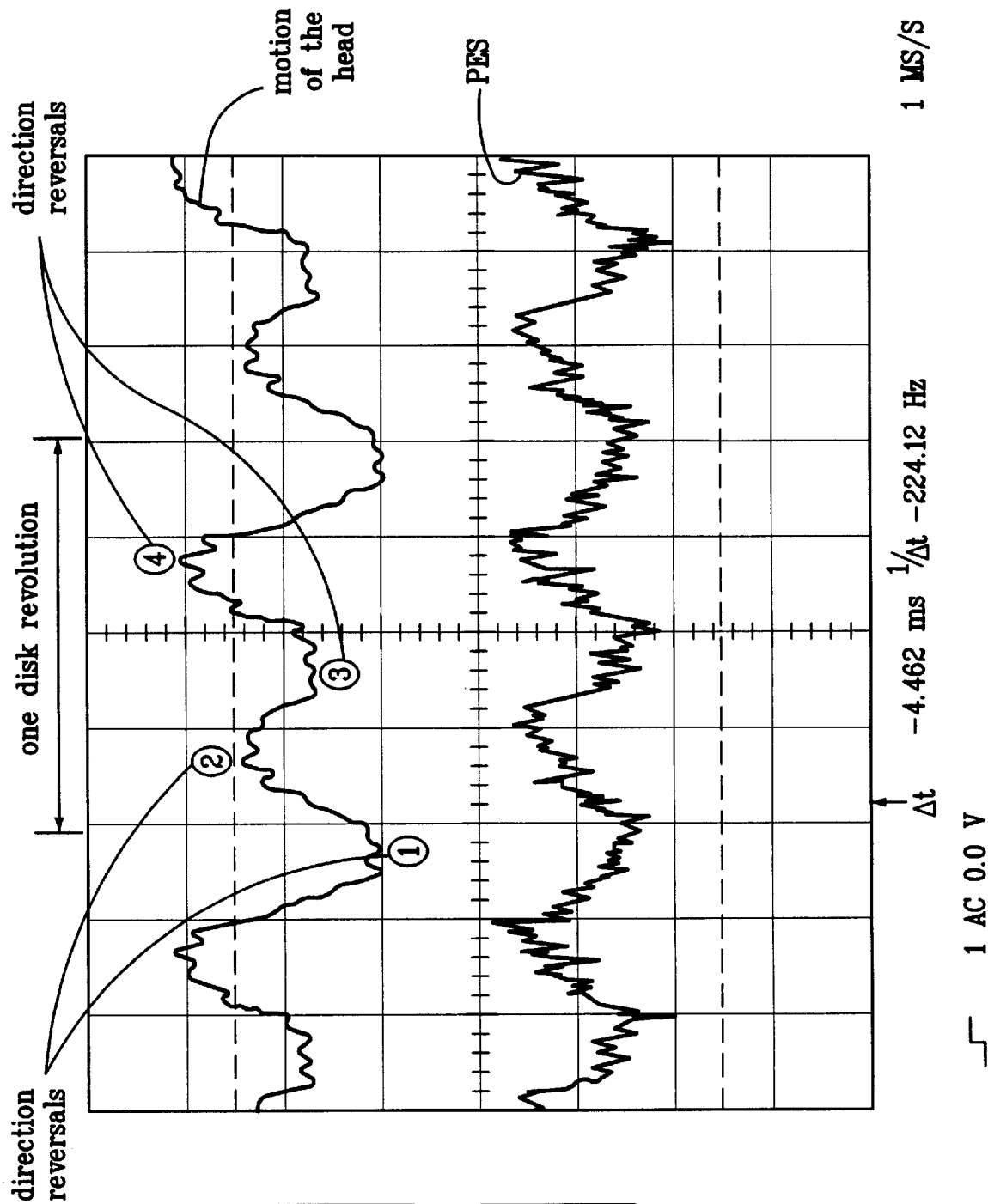
FIGS. 18A and 18B show graphs of a dominant 2f runout actuator motion.

When 2f runout is dominant, PES and head motion are as shown in FIG. 18A. Four direction reversals of the actuator per disk revolution are shown in this case which leads to an almost pure 2f looking PES signal. The amplitude of the actuator motion is only about 3.5 microns (about 1 volt with 3.5 micron/volt sensitivity). The PES peaks coincide with the directional reversal in actuator motion and have the characteristic turnaround feature.

Figure 18B:
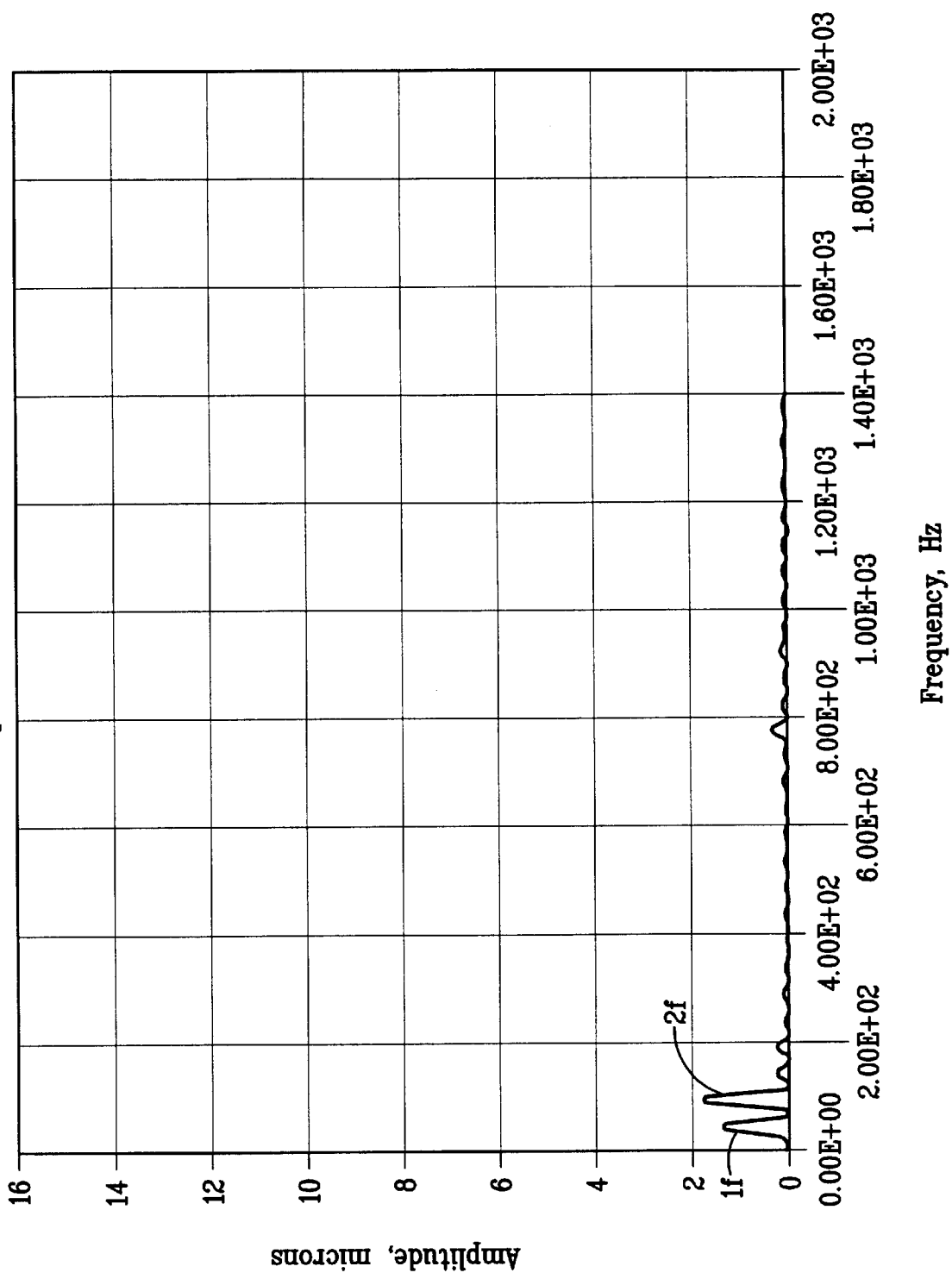

Therefore, the 1f runout amplitude is reduced substantially while the 2f runout amplitude remains substantially unchanged and is thus not significantly influenced by the alignment of the motor shaft or spindle 409 and the disk hub hole 19. FIG. 18B shows the 2f dominance. The 2f motion remains largely the same at about 1.8 microns because part of the 2f motion is overshadowed by friction. The ratio of 1f/2f amplitudes is about 0.8, which is much less than the inventor-determined critical ratio of about four that is needed to eliminate the undesirable 2f phenomenon.

Thus, the inventors have determined that the occurrence of additional directional reversals depends on the ratio of 1f and 2f amplitudes in radial runout and the phase between the 1f and 2f components. When 1f is in phase with 2f, for example, four directional reversals in actuator motion can occur if 1f amplitude is not greater than about four times the 2f amplitude. The critical ratio of 1f and 2f amplitude is less than about four when 1f radial runout is not in phase with the 2f runout.

The inventors have determined that the 2f phenomenon is eliminated if a large enough 1f radial runout is present. Because the 1f runout is largely determined by hub center to motor spindle alignment, the 1f runout varies considerably with cartridge insertion and removal, making it difficult to predict. Because of this, off-track errors can occur, in which data intended for one track N+1 overwrites data previously written on a neighboring track N. The present invention is directed to increasing the 1f radial runout to eliminate the transient 2f problem. It should be noted that 1f is typically undesirable and it is usually desirable to minimize 1f runout. In accordance with the present invention, however, 1f runout is desirable and intentionally generated.

First Embodiment

Figure 19:
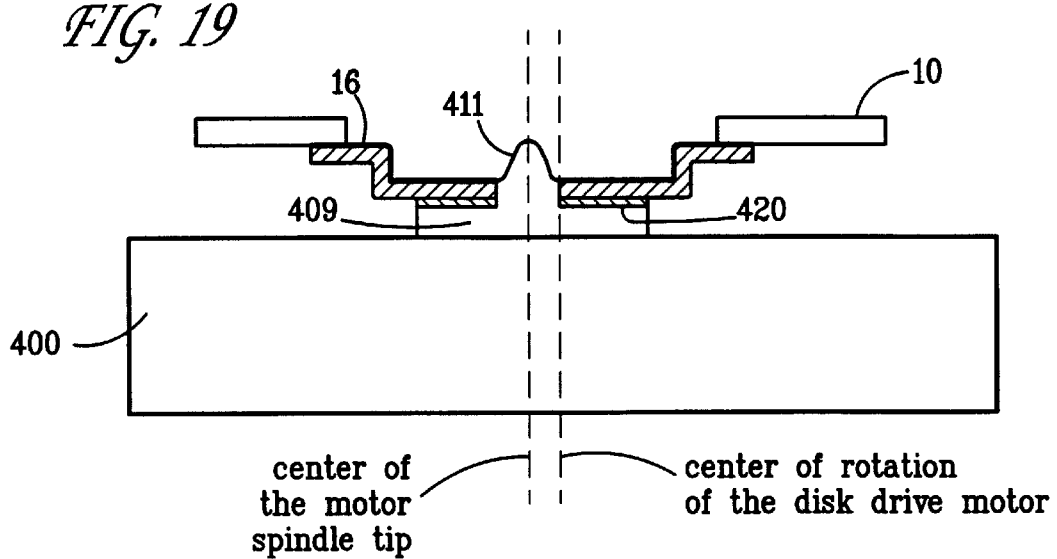
FIG. 19 is cross-sectional view of an exemplary disk cartridge and disk drive motor in accordance with the present invention.

A first embodiment of the present invention is described with respect to FIG. 19. The hub 16 of the disk 10 is positioned on the spindle 409 as described above with respect to FIGS. 13–15. However, the center of the tip 411 of the motor spindle 409 is intentionally misaligned with respect to center of rotation of the motor 400. This misalignment can be manufactured by machining the tip 411 to be offset with respect to the base of the motor spindle. Alternatively, the motor spindle 409 itself can be misaligned on the disk drive motor 400, so that the tip 411 is centered on motor spindle 409 and the motor spindle 409 is not centered on the disk drive motor 400 (not shown). Thus, when a disk 10 is spun by the motor 400, a large 1f runout is generated. The 1f runout is preferably large enough to eliminate the transient 2f problem described above.

The amount of 1f runout is proportional to the separation distance between the center of rotation of the motor 400 and the center of the tip 411 of the motor spindle 409. As the separation distance increases, the 1f runout increases. Preferably, the separation distance is at least about 15 $\mu$m, and more preferably about 100 $\mu$m. More preferably, the ratio of 1f amplitude to 2f amplitude is at least about four.

The spindle shaft is offset with respect to the center of rotation of the disk drive motor and the base of the spindle that it rests on.

Second Embodiment

Figure 20B:
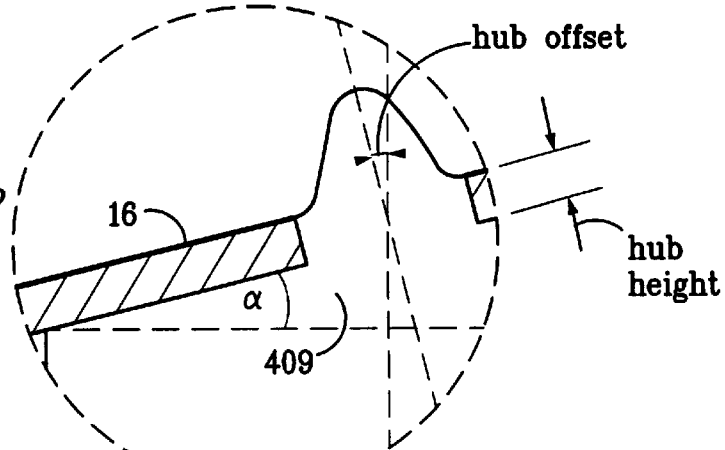
FIG. 20 is cross-sectional view of another exemplary disk cartridge and disk drive motor in accordance with the present invention.
Figure 20A:
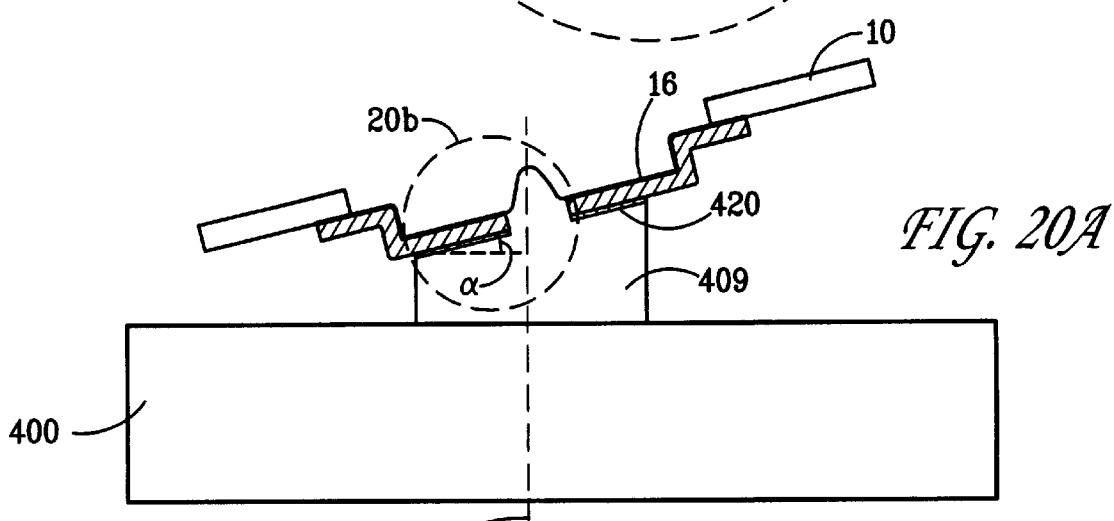

A second embodiment of the present invention is described with respect to FIG. 20. The hub 16 of the disk 10 is positioned on the spindle 409 as described above with respect to FIGS. 13–15. Moreover, the center of rotation of the motor 400 is aligned with respect to center of the motor spindle 409. In other words, the center of the motor spindle 409 remains equal to the center of rotation of the disk drive motor 400. However, the surface of the bushing 420 of the motor spindle 409 on which the hub 16 of the disk 10 is mounted is not perpendicular to the axis of rotation. The surface of the bushing 420 is disposed at an angle a, so that the disk is not lying perpendicular to the axis of rotation of the motor spindle. This angled platform generates an off-centered spinning of the disk when the disk spun, thereby introducing 1f runout sufficient to eliminate the transient 2f problem described above. The amount of 1f runout is proportional to the offset of the hub 16 from the axis of rotation. The offset of the hub 16 equals the height of the hub multiplied by sin $\alpha$. As the offset increases, the 1f runout increases. In a ZIP™ disk cartridge, the hub height is about 2.84 mm. A preferred angle a is about 2 degrees, which results in an offset of about 100 $\mu$m when used with a ZIP™ disk cartridge. Preferably, the ratio of 1f amplitude generated to 2f amplitude is at least about four.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. A method for intentionally generating sufficient 1f runout on tracks on a data storage disk using a disk drive spindle motor having a motor spindle with a spindle bushing and a tip, and a read/write head, to prevent 2f runout from interfering with the alignment of the read/write head with respect to the tracks, comprising:

misaligning the tip of the motor spindle a predetermined distance with respect to the center of rotation of the disk drive spindle motor;

mounting the data storage disk on the spindle bushing centered on the tip;

spinning the data storage disk up to an operational speed; and loading the read/write head onto a surface of the data storage disk, thereby generating sufficient 1f runout to prevent 2f runout from interfering with the alignment of the read/write head with respect to the tracks, the 1f runout having a 1f peak amplitude and the 2f runout having a 2f peak amplitude.

2. The method according to claim 1, wherein the predetermined distance is about 100 $\mu$m.

3. The method according to claim 1, wherein the 1f peak amplitude is substantially equal to the predetermined distance.

4. The method according to claim 1, wherein the ratio of the 1f peak amplitude to 2f peak amplitude is at least about four.

5. A system for intentionally generating sufficient 1f runout on tracks on a data storage disk using a disk drive spindle motor having a motor spindle, a spindle bushing and a tip, and a read/write head, to prevent 2f runout from interfering with the alignment of the read/write head with respect to the tracks, comprising:

a disk drive spindle motor;

a motor spindle coupled to the disk drive spindle motor having the spindle bushing and the tip on which the data storage disk is mounted, the tip of the motor spindle misaligned a predetermined distance with respect to the center of rotation of the disk drive spindle motor; and a read/write head for reading and writing tracks on a surface of the data storage disk, wherein when the data storage disk is spun up to an operational speed and the read/write head is loaded onto a surface of the data storage disk, sufficient 1f runout is generated to prevent 2f runout from interfering with the alignment of the read/write head with respect to the tracks, the 1f runout having a 1f peak amplitude and the 2f runout having a 2f peak amplitude.

6. The system according to claim 5, wherein the predetermined distance is about 100 $\mu$m.

7. The system according to claim 5, wherein the 1f peak amplitude is substantially equal to the predetermined distance.

8. The system according to claim 5, wherein the ratio of the 1f peak amplitude to 2f peak amplitude is at least about four.

9. A method for intentionally generating sufficient 1f runout on tracks on a data storage disk using a disk drive spindle motor having a motor spindle with a spindle bushing and a tip, and a read/write head, to prevent 2f runout from interfering with the alignment of the read/write head with respect to the tracks, comprising:

aligning the tip of the motor spindle with the center of rotation of the disk drive spindle motor;

disposing the spindle bushing at a predetermined non-perpendicular angle with respect to the axis of rotation of the motor spindle;

mounting the data storage disk on the spindle bushing;

spinning the data storage disk up to an operational speed; and loading the read/write head onto a surface of the data storage disk, thereby generating sufficient 1f runout to prevent 2f runout from interfering with the alignment of the read/write head with respect to the tracks, the 1f runout having a 1f peak amplitude and the 2f runout having a 2f peak amplitude.

10. The method according to claim 9, wherein the predetermined angle is about 2 degrees.

11. The method according to claim 9, wherein the 1f peak amplitude is proportional to the angle.

12. The method according to claim 9, wherein the ratio of the 1f peak amplitude to 2f peak amplitude is at least about four.

13. A system for intentionally generating sufficient 1f runout on tracks on a data storage disk using a disk drive spindle motor having a motor spindle, a spindle bushing and a tip, and a read/write head, to prevent 2f runout from interfering with the alignment of the read/write head with respect to the tracks, comprising:

a disk drive spindle motor;

a motor spindle coupled to the disk drive spindle motor having the spindle bushing and the tip on which the data storage disk is mounted, the spindle bushing disposed at a predetermined non-perpendicular angle with respect to the axis of rotation of the motor spindle; and a read/write head for reading and writing tracks on a surface of the data storage disk, wherein when the data storage disk is spun up to an operational speed and the read/write head is loaded onto a surface of the data storage disk, sufficient 1f runout is generated to prevent 2f runout from interfering with the alignment of the read/write head with respect to the tracks, the 1f runout having a 1f peak amplitude and the 2f runout having a 2f peak amplitude.

14. The system according to claim 13, wherein the predetermined angle is about 2 degrees.

15. The system according to claim 13, wherein the 1f peak amplitude is proportional to the angle.

16. The system according to claim 13, wherein the ratio of the 1f peak amplitude to 2f peak amplitude is at least about four.

* * * * *

UNITED STATES PATENT AND TRADEMARK OFFICE
CERTIFICATE OF CORRECTION

PATENT NO. : 6,236,536 B1
DATED : May 22, 2001
INVENTOR(S) : Yiping Ma and James M. Bero Page 1 of 1

It is certified that error appears in the above-identified patent and that said Letters Patent is hereby corrected as shown below:

Column 3,
Line 22, "systela" should be -- system --.

Column 11,
Line 60, "a" should be -- $\alpha$ --

Column 12,
Line 3, "a" should be -- $\alpha$ --

Signed and Sealed this

Fifteenth Day of January, 2002

Attest:

JAMES E. ROGAN
Director of the United States Patent and Trademark Office

Attesting Officer